United States Patent [19]

Inizan et al.

[11] Patent Number: 5,193,982
[45] Date of Patent: Mar. 16, 1993

[54] SEPARATE INTER-BLADE PLATFORM FOR A BLADED ROTOR DISK

[75] Inventors: Gérard F. Inizan, Paris; Gérard E. A. Jourdain, Saintry sur Seine; Philippe Pabion, Dammarie les Lys; Jean-Michel Payen, Le Mee sur Seine; Christine J. G. Ruffier, Vitry sur Seine, all of France

[73] Assignee: Societe Nationale d'Etude et de Construction de Moteurs D'Aviation S.N.E.C.M.A., Paris, France

[21] Appl. No.: 913,707

[22] Filed: Jul. 16, 1992

[30] Foreign Application Priority Data

Jul. 17, 1991 [FR] France .................................. 91 09013

[51] Int. Cl.$^5$ ............................................. F01D 5/22
[52] U.S. Cl. ............................ 416/193 A; 416/219 R; 416/244 R; 416/241 R; 416/248
[58] Field of Search ........... 416/193 A, 219 R, 244 R, 416/248, 241

[56] References Cited

U.S. PATENT DOCUMENTS

| | | | |
|---|---|---|---|
| 2,656,147 | 10/1953 | Brownhill | 416/193 A |
| 2,751,189 | 6/1956 | Ledwith | 416/193 A |
| 2,873,088 | 2/1959 | Neumann | 416/193 A |
| 3,294,364 | 12/1966 | Stancey | 416/219 R |
| 3,393,862 | 7/1968 | Harrison . | |
| 3,640,640 | 2/1972 | Palfreyman | 416/241 R |
| 3,661,475 | 5/1972 | Anderson et al. | 416/193 A |
| 3,712,757 | 1/1973 | Goodwin . | |
| 4,802,824 | 2/1989 | Gastebois et al. | 416/193 A |
| 5,049,035 | 9/1991 | Marlin | 416/193 A |

FOREIGN PATENT DOCUMENTS

| | | |
|---|---|---|
| 2639402 | 5/1990 | France . |
| 2006883 | 5/1979 | United Kingdom . |
| 2171151 | 8/1986 | United Kingdom . |

*Primary Examiner*—Edward K. Look
*Assistant Examiner*—Mark Sgantzos
*Attorney, Agent, or Firm*—Oblon, Spivak, McClelland, Maier & Neustadt

[57] ABSTRACT

A separate inter-blade platform for a bladed rotor disk of a turbo-machine comprises a first part in the form of a four-sided frame of generally trapezoidal shape and made of a laminated material, the frame having smaller and larger ends for location on the upstream and downstream sides respectively of the rotor disk, and two lateral sides interconnecting said ends for location between successive blades of the rotor, and a second part made of a relatively flexible and self-adhesive material of the polyurethane type attached to the first part, the second part defining a plate capping the frame over the greater part of its two lateral sides and leaving the smaller and larger end portions free, a portion enclosing the two lateral sides of the frame in line with the plate, and a plurality of evenly spaced, transverse reinforcing ribs which are integral with said enclosing portion and the underside of the plate.

4 Claims, 2 Drawing Sheets

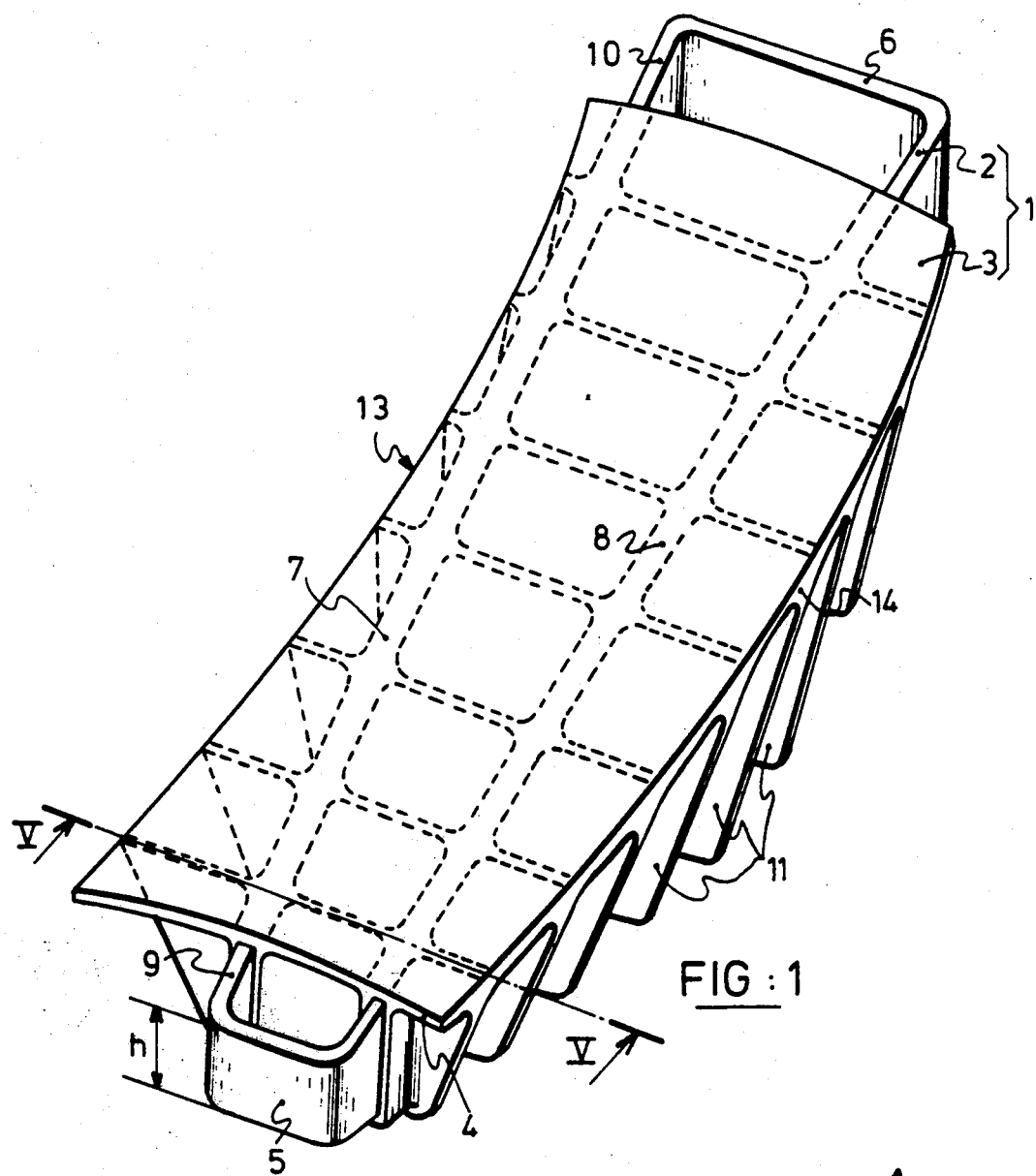
FIG: 1
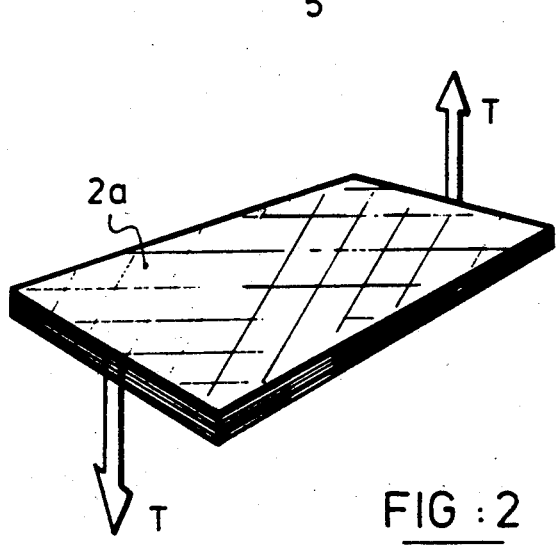
FIG: 2
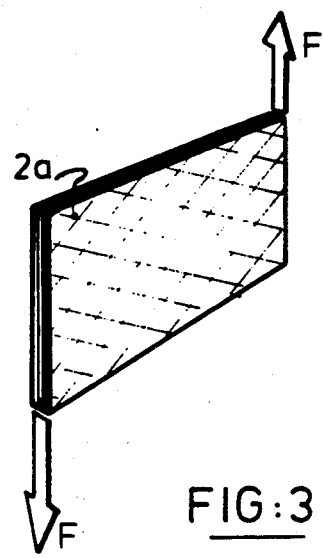
FIG: 3

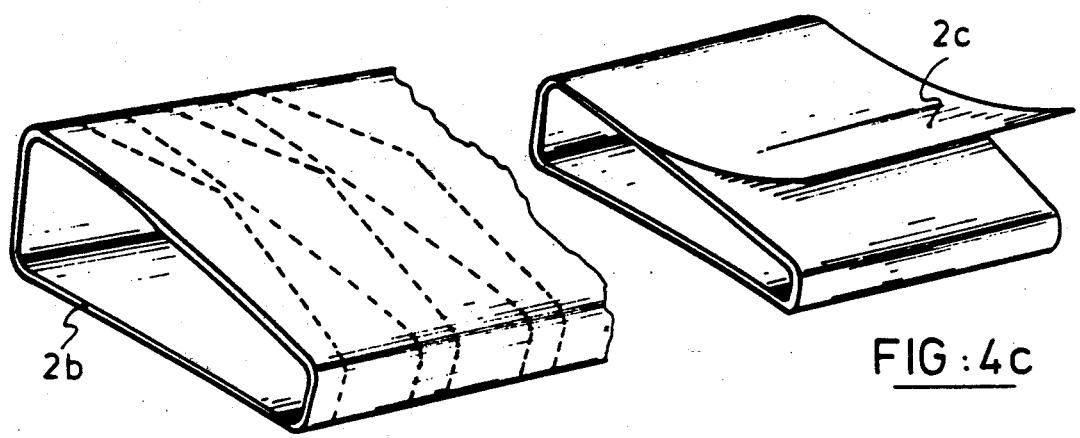
FIG:4a
FIG:4c
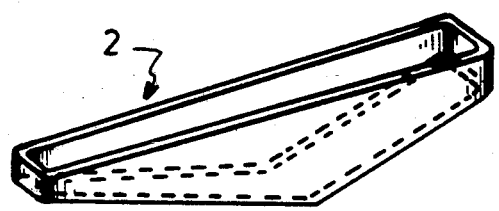
FIG:4b
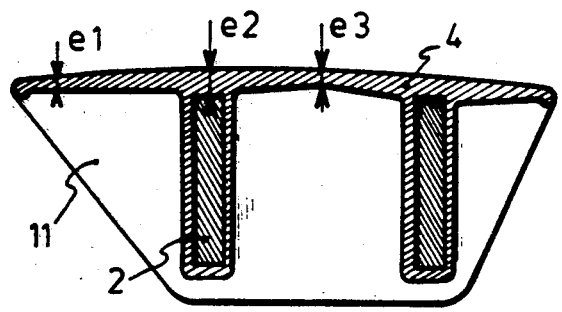
FIG:5
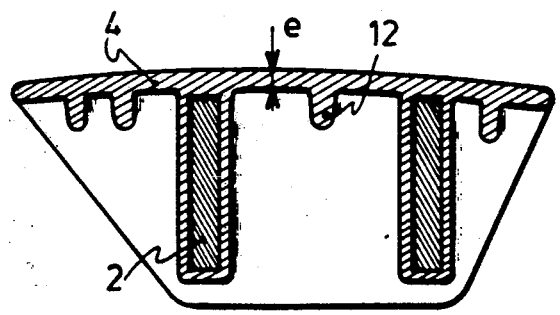
FIG:6

SEPARATE INTER-BLADE PLATFORM FOR A BLADED ROTOR DISK

BACKGROUND OF THE INVENTION

1. Field of the invention

The invention relates to a separate inter-blade platform for a bladed rotor disk of a turbo-machine, especially a rotor disk for a fan of a turbojet engine or for a compression stage of an aircraft engine.

2. Summary of the Prior Art

In the construction of turbo-machine rotors, particularly of the type mentioned above, it is known to construct the blades in several parts in order, for example, to permit unitary dismantling in the case of blades with a large chord and substantial twist, and/or to facilitate their manufacture, whether by machining operations or by using composite materials. In particular, it is known to construct the inter-blade platforms separately, one of the functions of these platforms being to define a continuous wall limiting the main air flow path. These known techniques are illustrated in particular by GB-A-2 006 883, GB-A-2 171 151 and US-A-3 393 862, which show the use of separate inter-blade platforms and various methods of fixing them on the rotor. The use of composite materials has also been envisaged for the manufacture of these parts. FR-A-2639402 discloses another example of a construction comprising various methods of achieving the fixing of the platform on the rotor disk, and in some cases the platform is made from a composite material of the type laminated by the winding or draping of fabrics.

SUMMARY OF THE INVENTION

It is an object of the invention to provide an improved inter-blade platform which enables the above-mentioned advantages of existing constructions to be retained, particularly the facility to remove the rotor blades individually, while keeping the mass as small as possible, this being an important requirement for a rotary component, especially in aeronautical applications.

It is a further object of the invention to ensure that the platforms have sufficient rigidity to avoid bending, especially under the action of centrifugal forces, so as not to modify the local aerodynamic conditions.

Furthermore, the applications envisaged, particularly in the case of the fan, involving a location upstream of the engine, impose a choice of material and a construction for the parts which will provide suitable resistance to impact and to the wear caused by the ingestion of foreign bodies at the engine intake, such as hailstones, gravel, sand or various types of dust.

With the aim of meeting these conditions in a manner better than the known constructions, according to the invention there is provided a separate inter-blade platform for a bladed rotor disk of a turbo-machine, said rotor disk defining a circumferential direction and having upstream and downstream sides, said platform comprising a first part made of a laminated first material and defining a four-sided frame of generally trapezoidal shape, said frame having smaller and larger ends which, in use, are located on the upstream and downstream sides respectively of said rotor disk, and two lateral sides interconnecting said smaller and larger ends for location between successive blades of said rotor disk, and a second part made of a relatively flexible and self-adhesive second material of the polyurethane type attached to said first part, said second part defining a plate capping said frame over the greater part of the said two lateral sides and leaving said smaller and larger ends free, a plurality of evenly spaced ribs carried by said plate and oriented such that, in use, said ribs extend in said circumferential direction of said rotor disk from one of said blades of said disk to the next, and a layer of said second material covering said lateral sides of said frame in line with said plate.

Other features and advantages of the invention will become apparent from the following description of the preferred embodiments, given by way of example, with reference to the attached drawings.

BRIEF DESCRIPTION OF THE DRAWINGS

FIG. 1 shows a diagrammatic perspective view of one embodiment of an inter-blade platform in accordance with the invention.

FIGS. 2 and 3 are diagrams of a sheet element made of laminated composite material indicating the direction of stresses which it is able to withstand weakly (FIG. 2) and strongly (FIG. 3).

FIGS. 4a, 4b and 4c are diagrams illustrating the manufacture of the structural frame forming the first part of the platform shown in FIG. 1.

FIG. 5 is a cross-sectional view of the first embodiment taken along line V—V in FIG. 1.

FIG. 6 is a view similar to that of FIG. 5, but showing a second embodiment.

DESCRIPTION OF THE PREFERRED EMBODIMENTS

One embodiment of a separate inter-blade platform 1 in accordance with the invention for mounting between two adjacent blades of a bladed rotor disk for a turbo-shaft engine, particularly a blower or a compression stage of the engine, is shown in FIG. 1 and consists of two parts 2 and 3. The first part 2 is formed as a structural frame having a generally trapezoidal shape, and the second part 3 forms a plate 4 which is supported by the frame 2.

The frame 2 is made of a laminated composite material, preferably of the type consisting of carbon fibres in an epoxy resin matrix, which exhibits sufficient mechanical strength characteristics to ensure the strength and the rigidity of the platform 1 in the centrifugal force field to which it is subjected during operation of the engine in which it is fitted. FIG. 2 is a diagram of an element 2a of laminated composite material subjected to stresses T in a direction perpendicular to the planes of the fibres or plies. In this direction, the resistance of the element to stresses, both shear and traction or compression, is low. On the other hand, the same element 2a subjected to similar shear, traction or compression stresses F in a direction contained in the plane of the fibres as shown in FIG. 3 presents a decidedly greater resistance, which may be as much as 50 times greater. Consequently, in the manufacture of the frame 2 the draping planes of the laminated compound material are arranged to lie in the plane in which maximum stress resistance is required. FIGS. 4a, 4b and 4c illustrate a method of manufacturing the frame 2 meeting these requirements. This operation involves draping the plies of the laminated material around a tubular former 2b of substantially trapezoidal cross-section as shown in FIG. 4a. The coated former is cut into sections along the dotted lines shown in FIG. 4a to obtain a number of frames 2 such as represented in FIG. 4b. The plies are bands arranged longitudinally or plies 2c wound around the tubular former as shown in FIG. 4c.

The trapezoidally shaped frame 2 obtained comprises a smaller end 5 and a larger end 6 interconnected by two lateral sides 7 and 8, the corners preferably being rounded off. The width h of the slices described above with reference to FIGS. 4a and 4b in the method of manufacture corresponds to the height of the frame 2.

The second part 3 of the platform 1 is preferably obtained by moulding it around the frame 2. For this purpose, the frame 2 is placed in a suitable mould, not shown in the drawings, and a relatively flexible and self-adhesive compound material of polyurethane type is then injected into the mould. The injected material encloses the lateral sides 7 and 8 of the frame 2, except for portions 9 and 10 at opposite ends which are integral with the end walls 5 and 6 and which are left clear. The injected material further forms a plate 4 which overlies the top of the frame 2 along the length of the sides 7 and 8 which is embedded in the material, and also a number of transverse ribs 11 which are joined integrally to the underside of the plate 4 and the portion embedding the frame 2. These ribs 11 are evenly spaced along the length of the plate 4 and serve to support and reinforce the plate 4, as well as contributing to the resistance of the platform 1 to the stresses experienced during use, especially those due to centrifugal action. The material chosen for the second part 3 also provides the surface of the plate 4 with resistance to impact and wear.

The platform cross-sections shown in FIGS. 5 and 6 show two alternative embodiments. In that shown in FIG. 5, the plate 4 has a progressively varying thickness e1,e2, e3 . . . , providing a corresponding distribution of the mass. In the other embodiment shown in FIG. 6, the plate 4 has a uniform, relatively small thickness e, and longitudinal reinforcement bars 112 are formed integrally on the underside. In both cases, the reduction of the mass subjected to the centrifugal force field during operation reduces the loads imposed on the frame 2, which enables the overall mass of the platform 1 to be reduced. In spite of the low modulus of elasticity of the material chosen, its low volume mass enables the deformation deflection in the centrifugal force field to be limited to admissibly low values.

In use, the platform 1 is placed between two successive blades of the rotor disk, the lateral edges 13 and 14 of the plate 4 extending beyond the lateral sides 7 and 8 of the frame 2 and coming into contact with the blades, while the free end portions 9 and 10 of the frame 2 locate under corresponding upstream and downstream elements of the rotor (not shown) for engagement therewith under the action of centrifugal forces created during operation of the engine.

We claim:

1. A separate inter-blade platform for a bladed rotor disk of a turbo-machine, said rotor disk defining a circumferential direction and having upstream and downstream sides, said platform comprising a first part made of a laminated first material and defining a four-sided frame of generally trapezoidal shape, said frame having smaller and larger ends which, in use, are located on the upstream and downstream sides respectively of said rotor disk, and two lateral sides interconnecting said smaller and larger ends for location between successive blades of said rotor disk, and a second part made of a relatively flexible and self-adhesive second material of the polyurethane type attached to said first part, said second part defining a plate capping said frame over the greater part of the said two lateral sides and leaving said smaller and larger ends free, a plurality of evenly spaced ribs carried by said plate and oriented such that, in use, said ribs extend in said circumferential direction of said rotor disk from one of said blades of said disk to the next, and a layer of said second material covering said lateral sides of said frame in line with said plate.

2. An inter-blade platform according to claim 1, wherein said laminated first material of said first part comprises carbon fibre and an epoxy resin matrix.

3. An inter-blade platform according to claim 1, wherein said plate has a uniform thickness and reinforcing bars are provided on said plate.

4. An inter-blade platform according to claim 1, wherein the thickness of said plate varies progressively so as to distribute the mass thereof.

* * * * *